United States Patent Office.

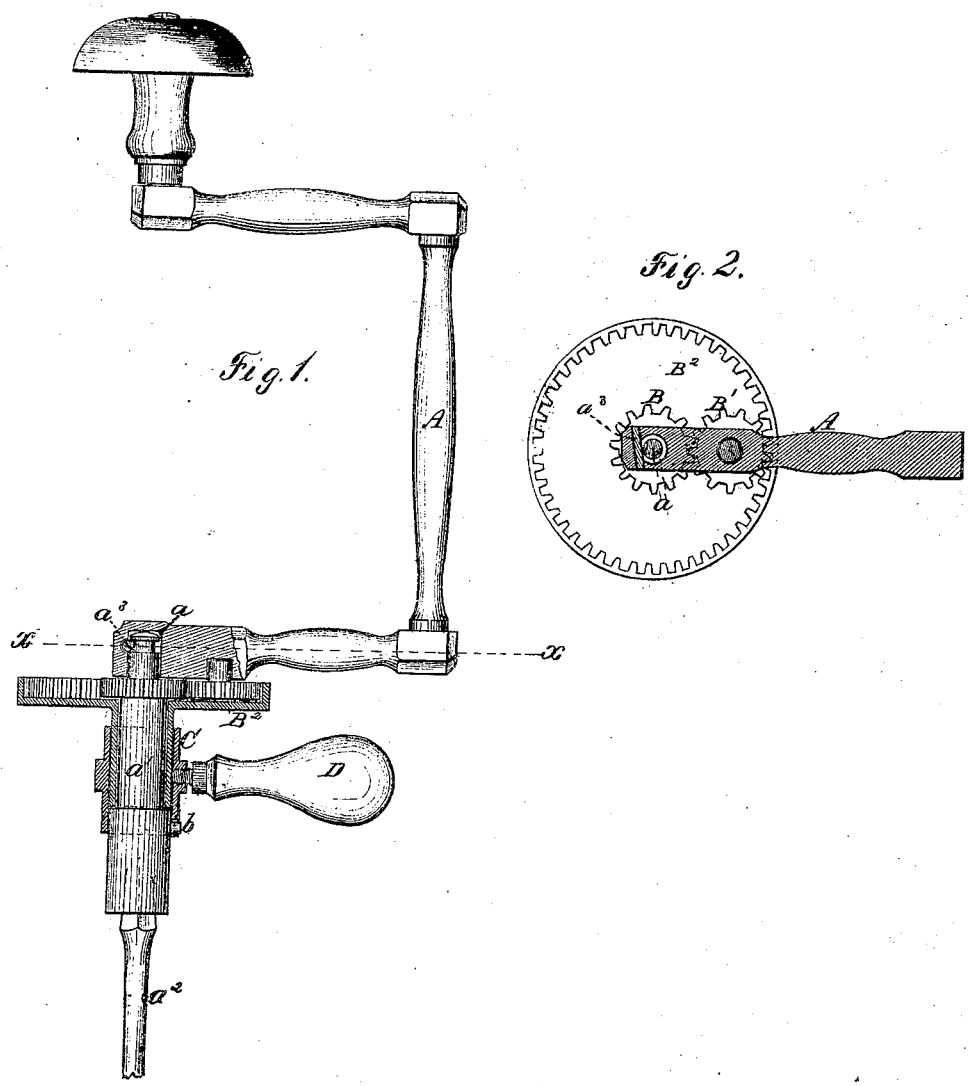

GEORGE G. PARKER AND WILLIAM P. DODGE, OF PROSPECT, NEW YORK.

Letters Patent No. 112,842, dated March 21, 1871.

IMPROVEMENT IN BIT AND DRILL-BRACES.

The Schedule referred to in these Letters Patent and making part of the same.

*To all whom it may concern:*

Be it known that we GEORGE G. PARKER and WILLIAM P. DODGE, of Prospect, in the county of Oneida and State of New York, have invented a certain new and useful Improvement in Bit and Drill-Braces; and we do hereby declare the following to be a full, clear, and exact description thereof, reference being had to the accompanying drawing forming a part of the same, and in which—

Figure 1 represents a view of my invention, partly in section and partly in elevation, applied to an ordinary brace or stock; and Figure 2 represents a section of the same taken through the line $x$ $x$ of fig. 1, longitudinally.

Similar letters of reference in the several figures above alluded to indicate corresponding parts of my invention.

This invention appertains to an improvement in bit and drill-braces or stocks, and consists of combining with an ordinary brace or stock and its shank or holder for receiving the bit or drill, which holder revolves within a cylindrical aperture or recess in said stock, two or more pinions or cogs and an epicycloidal wheel formed on the flanges of a disk, which is provided with a neck fitting on the reduced portion of the shank of the brace, said neck of disk being furnished with a collar or coupling attachment, operated by a screw-handle, all constructed and arranged substantially as hereinafter set forth and claimed.

To enable those skilled in the art to which our invention relates to make and use the same, we will proceed to describe its construction and operation.

In the annexed drawing—

A designates an ordinary brace or stock, which is constructed with a cylindrical recess, $a$, to receive the upper end of the shank or holder $a^1$, which receives the bit $a^2$ or drill.

The shank or bit-holder $a^1$ is formed or cut with an annular recess, as seen in fig. 1.

$a^3$ designates a pin passing diagonally through an aperture cut in the stock A, and entering the annular recess of the shank $a^1$, for the purpose of holding the said shank in place in its socket or recess $a$ of the said stock.

B designates a cog or pinion, secured horizontally upon the vertical cylindrical shank $a^1$, and gearing with a similar cog, $B^1$, whose axle or shaft has its bearing within a circular aperture in the stock A, as seen in the two figures, the lower side of said cog $B^1$ being formed with an elevation or shoulder, which rests upon the disk or plate $B^2$, but not secured to it.

$B^2$ is a disk or circular plate, the vertical flange formed around the periphery of which is constructed with an epicycloidal wheel, into the teeth of which enter the teeth of the cog $B^1$.

This disk is also constructed with a neck or hollow shank, which embraces loosely the shank $a^1$ of the stock A, as shown in fig. 1, the said shank $a^1$ being so reduced, where the neck of the disk $B^2$ envelops it, as to form at the point where said neck terminates an annular shoulder, to support and retain the said neck to the said shank, which is illustrated by the figure last referred to.

C designates a collar or coupler which surrounds the neck of the disk $B^2$ and the enlarged portion of the holder or shank $a^1$, as seen in fig. 1, and is constructed at its lower end with a semicircular recess, which receives the upper half of the cylindrical pin or stud $b$, fastened to the shank $a^1$, when the said collar is slipped downward, so as to unite the said neck and shank when desired.

The collar C is constructed also with a hollow screw-threaded shank or neck, to receive the screw-threaded portion of the handle of the tightener D, which is so constructed as to be easily grasped and turned or operated.

It will be observed that, by way of illustrating the operation of this machine, when the collar C is slipped down onto the shank $a^1$ of the brace A, as shown in fig. 1, the motion imparted to said shank through the cog gearing B $B^1$ $B^2$ when the brace A is revolved will be cut off from said shank, which receives the cutting-tool $a^2$, converting the machine into an ordinary brace; but when it is thrown or moved up from off the said shank the latter will receive motion from said gearing, which will greatly augment its velocity when in operation.

The tightener D is intended to be firmly screwed in place when the collar C is either slipped down or thrown up, in order to hold the latter in its proper place, and also forms a means whereby the brace and its tool-holder may be more firmly held in the proper position, causing the operation of boring to be accurately and well performed.

Having thus described our invention,

What we claim, and desire to secure by Letters Patent, is—

1. The combination of the collar or coupler C, having the tightener D, with the disk and shank $B^2$, and tool-holder $a^1$, substantially as herein described and for the purpose set forth.

2. The combination of the brace or stock A, shank $a^1$, gearing B $B^1$ $B^2$, coupler C, and tightener D, substantially as shown and described.

In testimony that we claim the foregoing as our invention we hereunto set our hands this 31st day of January, 1871, in presence of two subscribing witnesses.

G. G. PARKER.
WM. P. DODGE.

Witnesses:
G. PUCHARD,
JOHN HUGHES.